(12) United States Patent
Kikkawa

(10) Patent No.: US 12,471,696 B2
(45) Date of Patent: Nov. 18, 2025

(54) INTERDENTAL CLEANING TOOL

(71) Applicant: KOBAYASHI PHARMACEUTICAL CO., LTD., Osaka (JP)

(72) Inventor: Tasuku Kikkawa, Ibaraki (JP)

(73) Assignee: KOBAYASHI PHARMACEUTICAL CO., LTD., Osaka (JP)

( * ) Notice: Subject to any disclaimer, the term of this patent is extended or adjusted under 35 U.S.C. 154(b) by 1251 days.

(21) Appl. No.: 17/050,534

(22) PCT Filed: Apr. 26, 2019

(86) PCT No.: PCT/JP2019/017967
§ 371 (c)(1),
(2) Date: Mar. 26, 2021

(87) PCT Pub. No.: WO2019/208781
PCT Pub. Date: Oct. 31, 2019

(65) Prior Publication Data
US 2023/0148741 A1   May 18, 2023

(30) Foreign Application Priority Data

Apr. 27, 2018 (JP) .................. 2018-087033

(51) Int. Cl.
*A46B 9/02* (2006.01)
*A61C 15/02* (2006.01)
*A46B 3/18* (2006.01)

(52) U.S. Cl.
CPC .............. *A46B 9/025* (2013.01); *A61C 15/02* (2013.01); *A46B 3/18* (2013.01); *A46B 2200/108* (2013.01)

(58) Field of Classification Search
CPC .......... A46D 1/207; A46B 9/025; A46B 9/04; A46B 15/0081
See application file for complete search history.

(56) References Cited

U.S. PATENT DOCUMENTS

| | | | | |
|---|---|---|---|---|
| 5,355,547 | A | * | 10/1994 | Fitjer ........................ A46B 7/04 15/167.1 |
| 5,778,476 | A | * | 7/1998 | Squillaci .................. A46B 3/18 15/207.2 |

(Continued)

FOREIGN PATENT DOCUMENTS

| CN | 107184288 A | 9/2017 |
|---|---|---|
| DE | 9202508 U1 | 4/1992 |

(Continued)

OTHER PUBLICATIONS

Communication pursuant to Article 94(3) EPC of European Patent Application No. 19791509.3 dated Sep. 29, 2022 (5 sheets).

(Continued)

*Primary Examiner* — Michael D Jennings
(74) *Attorney, Agent, or Firm* — Kratz, Quintos & Hanson, LLP

(57) ABSTRACT

Provided is an interdental cleaning tool that can reduce at least one of a resistance against insertion in an interdental space and a resistance against withdrawal from an interdental space, and has a high capability of scraping out deposit from an interdental space. The interdental cleaning tool includes a base portion including a shaft portion (20) and a cleaning portion (40). The cleaning portion (40) includes a cleaning portion body (50) and a plurality of bristles (60). The plurality of bristles (60) include at least one of a type of top end-oriented bristles and a type of base end-oriented bristles. The top end-oriented bristle has a shape titling to a top end side of the shaft portion (20) as advancing away from an outer circumferential surface of the cleaning portion body (50). The base end-oriented bristle has a shape tilting to a base end side of the shall portion (20) as advancing away from the outer circumferential surface of the cleaning portion body (50).

5 Claims, 5 Drawing Sheets

(56) References Cited

U.S. PATENT DOCUMENTS

| | | | |
|---|---|---|---|
| 2003/0027101 A1* | 2/2003 | Victoria | A46B 3/18 |
| | | | 433/142 |
| 2004/0112400 A1* | 6/2004 | Kurek | D01F 8/00 |
| | | | 132/218 |
| 2006/0272667 A1* | 12/2006 | Wyatt | A46B 13/00 |
| | | | 132/218 |
| 2010/0101038 A1 | 4/2010 | Garbers | |
| 2012/0000483 A1* | 1/2012 | Snedden | A46B 15/0069 |
| | | | 132/321 |
| 2014/0352089 A1 | 12/2014 | Garbers | |
| 2015/0114428 A1 | 4/2015 | Kato | |
| 2015/0257523 A1* | 9/2015 | Butz | A46B 9/005 |
| | | | 132/309 |
| 2016/0058531 A1 | 3/2016 | Adriano | |
| 2017/0189148 A1 | 7/2017 | Kato | |
| 2018/0213923 A1* | 8/2018 | Corbellini | A46B 9/021 |
| 2018/0250104 A1 | 9/2018 | Adriano | |
| 2018/0256298 A1 | 9/2018 | Kikkawa | |
| 2019/0038013 A1 | 2/2019 | Garbers | |
| 2019/0192265 A1 | 6/2019 | Kikkawa | |

FOREIGN PATENT DOCUMENTS

| | | | | |
|---|---|---|---|---|
| DE | 202007005437 U1 | 11/2007 | | |
| FR | 2958130 A1 * | 10/2011 | | A45D 40/262 |
| JP | 2016-521159 A | 7/2016 | | |
| KR | 10-2016-0123126 A | 10/2016 | | |
| WO | 2006/125268 A1 | 11/2006 | | |
| WO | 2008/022480 A1 | 2/2008 | | |
| WO | 2010/105390 A1 | 9/2010 | | |
| WO | WO-2011121526 A1 * | 10/2011 | | A45D 40/262 |
| WO | 2013/176297 A1 | 11/2013 | | |
| WO | WO-2014023395 A1 * | 2/2014 | | A46B 1/00 |
| WO | WO-2014206547 A1 * | 12/2014 | | A46B 3/005 |
| WO | WO-2016075282 A1 * | 5/2016 | | A45D 34/045 |
| WO | WO-2016185487 A1 * | 11/2016 | | A46B 3/18 |
| WO | 2017/038654 A1 | 3/2017 | | |
| WO | 2017/155253 A1 | 9/2017 | | |
| WO | 2018/062135 A1 | 4/2018 | | |

OTHER PUBLICATIONS

International Search Report for International Application No. PCT/JP2019/017967 dated Jul. 16, 2019 (2 sheets, 2 sheets translation, 4 sheets total).

Extended European Search Report for European Patent Application No. 19791509.3 issued May 14, 2021 (8 sheets).

* cited by examiner

INTERDENTAL CLEANING TOOL

TECHNICAL FIELD

The present invention relates to an interdental cleaning tool.

BACKGROUND ART

Conventionally, an interdental cleaning tool for cleaning an interdental space is known. For example. Patent Literature 1 discloses an interdental cleaning tool including a base structure portion made of synthetic resin, and a soft portion made of elastomer. The base structure portion includes a core base structure portion having a shape insertable in an interdental space, and a handling base structure portion having a shape that can be held by fingers. The soft portion includes a covering portion that covers an outer circumferential surface of the core base structure portion, and a plurality of protruding portions each provided on an outer circumferential surface of the covering portion. Each of the protruding portions has a shape extending outward from the outer circumferential surface of the covering portion in a direction perpendicularly intersecting an axial direction of the core base structure portion.

CITATION LIST

Patent Literature

Patent Literature 1: WO 2013/176297 A

SUMMARY OF INVENTION

Problems to be Solved by the Invention

In the interdental cleaning tool described in Patent Literature 1, there have been the needs of enhancing the capability of scraping out deposits from an interdental space. Therefore, it has been considered to make protruding portions larger or give a higher rigidity to them. However, the employment of such configuration causes an increased resistance when inserting the tool in the interdental space or withdrawing the tool from the interdental space.

An object of the present invention is to provide an interdental cleaning tool dial can reduce at least one of the resistance against insertion in an interdental space and the resistance against withdrawal from an interdental space, and has a high capability of scraping out deposit from an interdental space.

Solution to Problem

To solve the problem described above, the present invention provides an interdental cleaning tool including: a base portion including a shaft portion having a shape insertable in an interdental space: and a cleaning portion that covers at least a portion of the shaft portion and is capable of cleaning an interdental space, in which the cleaning portion includes a cleaning portion body that covers at tat a portion of the shaft portion, and a plurality of bristles each having a shape protruding outward from an outer circumferential surface of the cleaning portion body, and the plurality of bristles include at least one of a type of top end-oriented bristles having a shape tilting to a top end side of the shaft portion as advancing away from the outer circumferential surface of the cleaning portion body, and a type of base end-oriented bristles having a shape tilting to a base end side of the shaft portion as advancing away from the outer circumferential surface of the cleaning portion body.

Since the plurality of bristles of the interdental cleaning tool includes at least one of the type of top end-oriented bristles and the type of base end-oriented bristles, at least one of the resistance against insertion of the cleaning portion in the interdental space unci the resistance against withdrawal of the cleaning portion from the interdental space can be reduced, and the capability of the cleaning portion of scraping out deposit from the interdental space can be raised. Specifically, the lop end-oriented bristle causes a high resistance against insertion in the interdental space while having a high capability of scraping out deposit during insertion in the interdental space, and causes a low resistance against withdrawal from the interdental space, compared to a conventional bristle having a shape protruding from an outer circumferential surface of a cleaning portion body in a direction perpendicularly intersecting an axial direction of a shaft portion (hereinafter referred to as "non-tilted bristle"). Meanwhile, the base end-oriented bristle causes a high resistance against withdrawal from the interdental space, but has a low resistance against insertion in the interdental space and has a high capability of scraping out deposit during withdrawal from the interdental space, compared to the conventional non-tilted bristle.

Each of the plurality of bristles may be the type of base end-oriented bristle.

In the configuration, both reduction in the resistance against insertion in the interdental space and improvement in the scraping out capability during withdrawal from die interdental space can be achieved.

Alternatively, the plurality of bristles may include the type of top end-oriented bristles and the type of base end-oriented bristles, and the type of top end-oriented bristles and the type of base end-oriented bristles may alternately be arranged along the axial direction of the shaft portion from the top end side to the base end side of the shaft portion.

The cleaning portion of the interdental cleaning tool may be preferably made of a composite material containing elastomer and a reinforcing material.

In this way, the bristles are given a higher rigidity than a case where the cleaning portion is made only of elastomer. Accordingly, side surfaces of the teeth can effectively be cleaned.

Advantageous Effects of Invention

The present invention can provide, as described above, an interdental cleaning tool that can reduce at least one of a resistance caused when inserting the interdental cleaning tool in an interdental space and a resistance caused when withdrawing the interdental cleaning tool from an interdental space, and has a high capability of scraping out deposit from art interdental space.

DESCRIPTION OF EMBODIMENT

Figure 1:
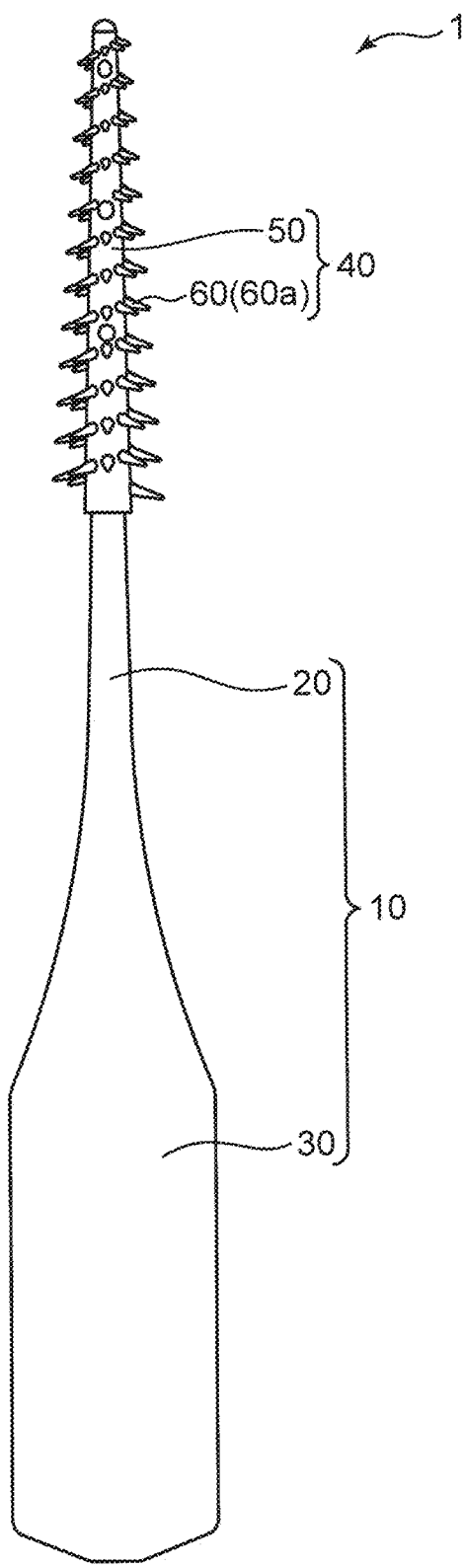
FIG. 1 is a front view of an interdental cleaning tool according to an embodiment of the present invention.
Figure 2:
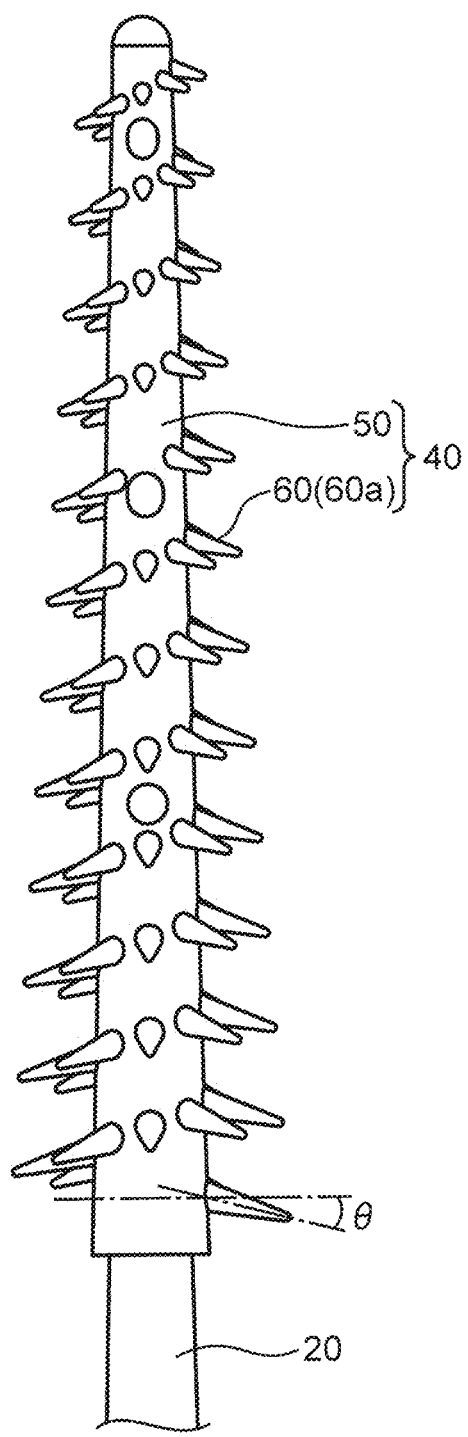
FIG. 2 is an enlarged view of a cleaning portion of the interdental cleaning tool illustrated in FIG. 1.
Figure 3:
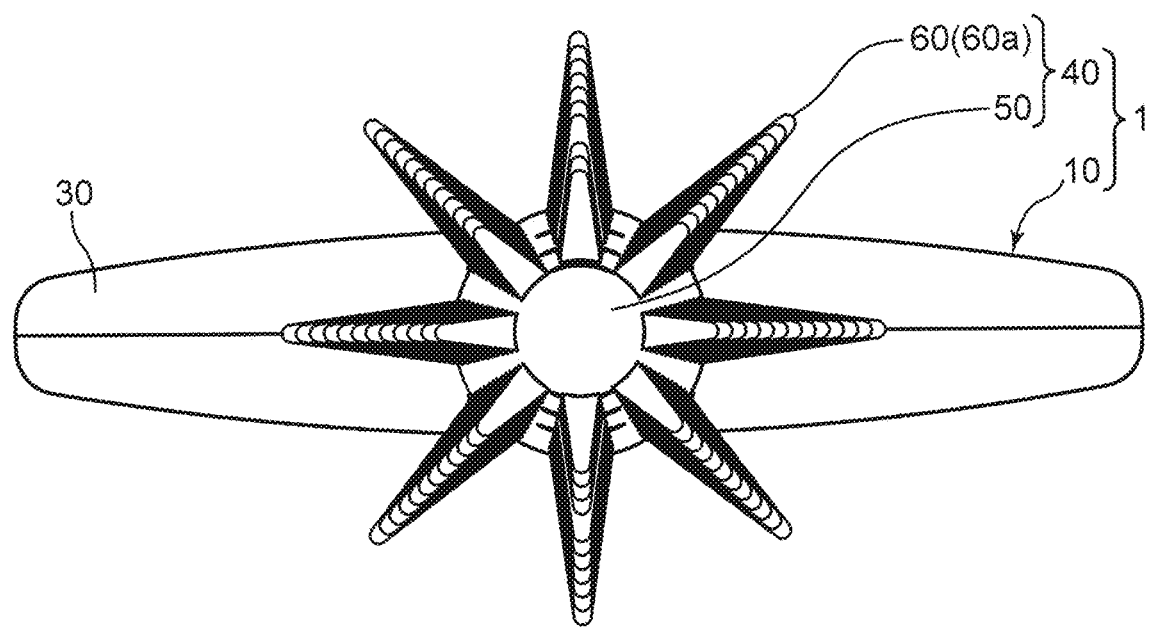
FIG. 3 is a plan view of the interdental cleaning tool illustrated in FIG. 1.

An interdental cleaning tool 1 according to one embodiment of the present invention will be described with reference to FIGS. 1 to 3. As illustrated in FIG. 1, the interdental cleaning tool 1 includes a base portion 10, and a cleaning portion 40.

The base portion 10 is made of a synthetic resin such as polypropylene, polyethylene, ABS, polybutylene terephthalate, polycarbonate, polyethylene terephthalate, polystyrene, and polyacetal. In the embodiment, the base portion 10 is made of polypropylene containing glass fibers by 30% by weight. The base portion 10 includes a shaft portion 20, and a grip portion 30.

The shaft portion 20 has a shape extending straight in a specific direction (up-and-down direction in FIG. 1) and insertable in an interdental space. The shaft portion 20 has a shape whose cross sectional size of the shaft portion 20 in a plane perpendicularly intersecting an axial direction of the shaft portion 20 (the up-and-down direction in FIG. 1) gradually increases along a direction from a top end side to a base end side (opposite the top end side) of the shaft portion 20. In the embodiment, the cross section of the shaft portion 20 in the plane is a circle. In other words, in the embodiment, the shaft portion 20 has a form of a column of which outer diameter gradually decreases from a base end portion to a lop end portion of the shaft portion 20. The cross section of the shaft portion 20 may be an oval shape or a polygonal shape.

The grip portion 30 extends in the axial direction of the shaft portion 20 away from the base end portion of the shaft portion 20 and has a shape that can be held by fingers. The grip portion 30 is formed into a flat shape.

The cleaning portion 40 is adapted for cleaning an interdental space and side surfaces of teeth. The cleaning portion 40 is made of a resin material having a lower hardness than the base portion 10. Specifically, styrene elastomer is used as the resin material. Other materials, such as silicone, olefinic elastomer, and polyester elastomer, may also be used as the resin material. The cleaning portion 40 includes a cleaning portion body 50, and a plurality of bristles 60.

The cleaning portion body 50 covers at least a portion of the shaft portion 20 (the portion including the top end portion of the shaft portion 20). The cleaning portion body 50 has a shape whose profile gradually increases along the direction from the top end side to the base end side of the shaft portion 20.

Each of the bristles 60 is provided on an outer circumferential surface of the cleaning portion body 50. The bristle 60 has a shape protruding outward from the outer circumferential surface of the cleaning portion body 50 in an intersecting direction that intersects the axial direction, in the embodiment, the bristle 60 has the shape of a cone. Each of the bristles 60 is a base end-oriented having a shape tilting to the base end side (lower side in FIG. 2) of the shaft portion 20 as advancing away from the outer circumferential surface of the cleaning portion body 50. As illustrated in FIG. 2, a tilt angle θ of the base end oriented (angle between a plane perpendicularly intersecting the axial direction of the shaft portion 20 and a direction in which the base end-oriented bristle protrudes from the cleaning portion body 50) is preferably set at a degree of 1 or more and 70 or less, more preferably at 5 or more and 45 or less, furthermore preferably at 10 or more and 30 or less, and particularly preferably at 15 or more and 20 or less. The direction in which the base end-oriented bristle protrudes from the cleaning portion body 50 is the direction along the axis of the base end-oriented bristle.

The bristles 60 have respectively such shapes that their protruding lengths from the cleaning portion body 50 gradually increase along the direction from the top end side to the base end side of the shaft portion 20. As illustrated in FIG. 3, the bristles 60 are provided at positions spaced from one another along a circumferential direction of the cleaning portion body 50 in a plan view. Specifically, the bristles 60 are arranged at an interval of 45 degrees along the circumferential direction.

As described above, since the plurality of bristles 60 of the interdental cleaning tool 1 are the base end-oriented bristles 60a, the resistance against insertion of the cleaning portion 40 in the interdental space can be reduced and at the same time the capability of scraping out deposit from the interdental space during the withdrawal of the cleaning portion 40 can be raised. Specifically, the base end-oriented bristle causes a high resistance against withdrawal from the interdental space while causing a low resistance against insertion in the interdental space, but has an increased capability of scraping out deposit during withdrawal from the interdental space, compared to a conventional bristle having a shape protruding from an outer circumferential surface of a cleaning portion body in a direction perpendicularly intersecting an axial direction of a shaft portion (hereinafter referred to as "non-tilted bristle").

Note that the embodiment disclosed above should be considered as illustrative in all aspects and not by means of limitation. The scope of the present invention is defined by the claims, not by the description on the embodiment described above, and includes all alterations within the scope of the meanings equivalent to the claims and within the scope of the claims.

Figure 4:
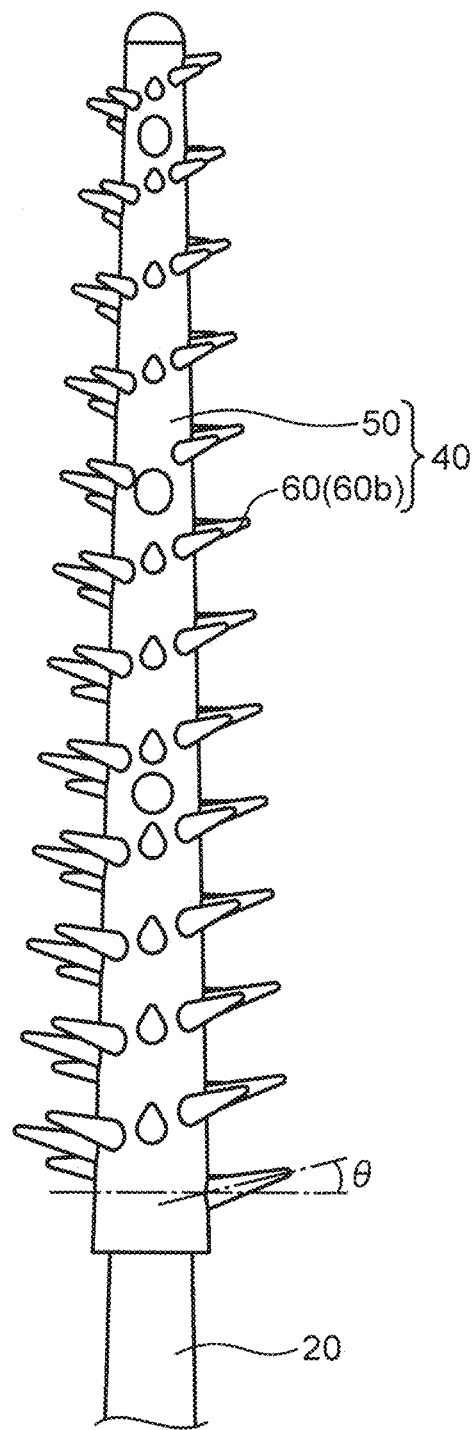
FIG. 4 is an enlarged view of a cleaning portion of another interdental cleaning tool

For example, as shown in FIG. 4, a plurality of bristles 60 may each be a type of top end-oriented bristles 60b having a shape tilting to a top end side of the shaft portion 20 as advancing away from the outer circumferential surface of the cleaning portion body 50. In this configuration, the resistance against withdrawal of the cleaning portion 40 from the interdental space can be reduced and the capability of scraping out deposit from the interdental space during insertion of the cleaning portion 40 can be raised. Specifically, the top end-oriented bristle causes a high resistance against insertion in the interdental space while having a high capability of scraping out the deposit during insertion in the interdental space, and causes a low resistance against withdrawal from the interdental space, compared to the non-tilted bristle.

Figure 5:
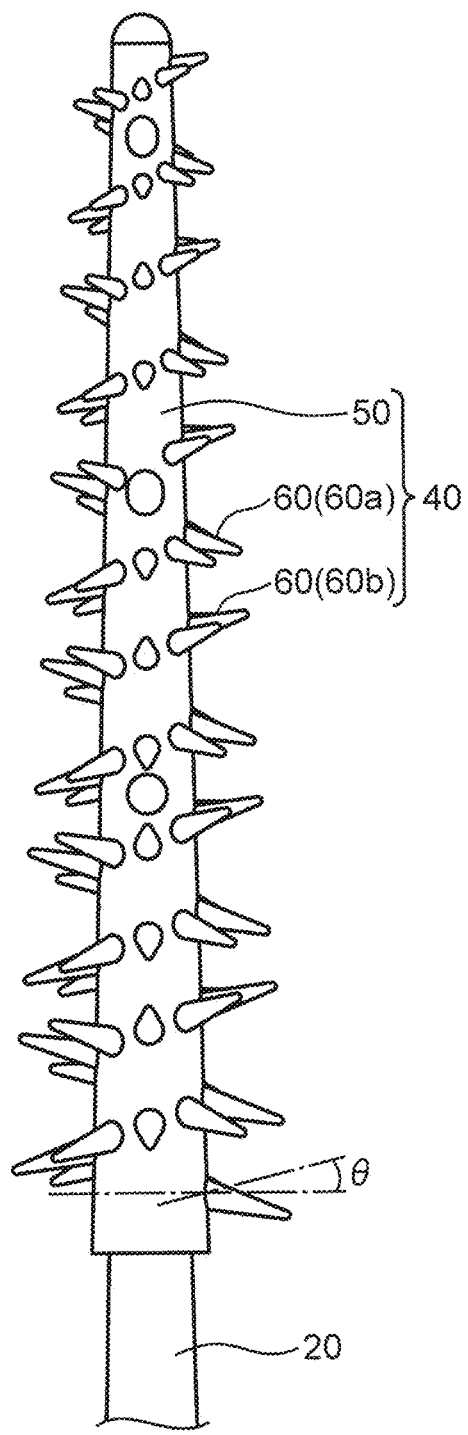
FIG. 5 is an enlarged view of a cleaning portion of another interdental cleaning tool.

Furthermore, as shown in FIG. 5, a plurality of bristles 60 may include both the type of top end-oriented bristles 60b and the type of base end-oriented bristles 60a. In this case, the type of top end-oriented bristles 60b and the type of base end-oriented bristles 60a may alternately be arranged along the axial direction from the top end side to the base end side of the shaft portion 20.

Furthermore, respective tilt angles θ of the bristles 60 may not be set at the same. For example, their respective tilt angles θ may be set so as to be smaller along the direction from the top end side to the base end side of the cleaning portion body 50.

Each of the bristles 60 may have the shape of a polygonal pyramid or a plate (flat shape).

The cleaning portion 40 may be made of a composite material containing a resin material and a reinforcing material (for example, glass fibers or talc). In this way, the bristles 60 are each given a higher rigidity than a case where the cleaning portion 40 is made only of elastomer. Accordingly, side surfaces of teeth can effectively be cleaned. In this case, the composite material preferably contains the reinforcing material by 3% by weight to 50% by weight, inclusive, more preferably 5% by weight to 35% by weight, inclusive.

REFERENCE SIGNS 1 interdental cleaning tool
10 base portion
20 shaft portion
30 grip portion
40 cleaning portion
50 cleaning portion body
60 bristle

The invention claimed is:

1. An interdental cleaning tool comprising:
a base portion including a shaft portion having a shape insertable in an interdental space; and
a cleaning portion that covers at least a portion of the shaft portion and is capable of cleaning an interdental space, wherein
the cleaning portion includes
a cleaning portion body that covers at least a portion of the shaft portion, and
a plurality of bristles each having a shape protruding outward from an outer circumferential surface of the cleaning portion body,
the plurality of bristles consists of a type of base end-oriented bristles having a shape tilting to a base end side of the shaft portion as advancing away from the outer circumferential surface of the cleaning portion body.

2. The interdental cleaning tool according to claim 1, wherein the cleaning portion is made of a composite material containing elastomer and a reinforcing material.

3. The interdental cleaning tool according to claim 1, wherein a tilt angle θ of the base end-oriented bristles is set at a degree of 1 or more and 70 or less.

4. The interdental cleaning tool according to claim 1, wherein a tilt angle θ of the top end-oriented bristles is set at a degree of 1 or more and 70 or less.

5. An interdental cleaning tool comprising:
a base portion including a shaft portion having a shape insertable in an interdental space; and
a cleaning portion that covers at least a portion of the shaft portion and is capable of cleaning an interdental space, wherein
the cleaning portion includes
a cleaning portion body that covers at least a portion of the shaft portion, and
a plurality of bristles each having a shape protruding outward from an outer circumferential surface of the cleaning portion body,
the plurality of bristles consists of a type of base end-oriented bristles having a shape tilting to a base end side of the shaft portion as advancing away from the outer circumferential surface of the cleaning portion body, wherein
a protrusion length of the plurality of bristles gradually increases along the direction from the top end side toward the base end side of the shaft portion.

\* \* \* \* \*